(12) United States Patent
Lundén et al.

(10) Patent No.: US 9,468,012 B2
(45) Date of Patent: *Oct. 11, 2016

(54) PRIORITY-BASED FAIRNESS AND INTERFERENCE SIGNALLING TECHNIQUE IN A FLEXIBLE SPECTRUM USE WIRELESS COMMUNICATION SYSTEM

(75) Inventors: Jari Petteri Lundén, Espoo (FI); Elena Virtej, Espoo (FI); Antti Sakari Sorri, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 883 days.

This patent is subject to a terminal disclaimer.

(21) Appl. No.: 13/127,858

(22) PCT Filed: Nov. 5, 2009

(86) PCT No.: PCT/IB2009/007339
§ 371 (c)(1),
(2), (4) Date: Oct. 16, 2011

(87) PCT Pub. No.: WO2010/052551
PCT Pub. Date: May 14, 2010

(65) Prior Publication Data
US 2012/0129560 A1 May 24, 2012

Related U.S. Application Data

(60) Provisional application No. 61/198,316, filed on Nov. 5, 2008.

(51) Int. Cl.
*H04W 72/10* (2009.01)
*H04W 16/04* (2009.01)
*H04W 72/04* (2009.01)

(52) U.S. Cl.
CPC ............ *H04W 72/10* (2013.01); *H04W 16/04* (2013.01); *H04W 72/0486* (2013.01)

(58) Field of Classification Search
CPC ... H04W 72/04; H04W 72/10; H04W 16/04; H04W 72/0486
USPC ................................ 455/525, 450–453, 509
See application file for complete search history.

(56) References Cited

U.S. PATENT DOCUMENTS 6,693,892 B1  2/2004  Rinne et al.
7,339,950 B2  3/2008  Nielsen et al.
(Continued)

FOREIGN PATENT DOCUMENTS

CN     101094433     12/2007
GB     2445988 A      7/2008
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network(E-UTRAN); Overall description; Stage 2 (Release 8)", 3GPP TS 36.300, v8.5.0, May 2008, pp. 1-134.
(Continued)

*Primary Examiner* — Raymond Dean
(74) *Attorney, Agent, or Firm* — Squire Patton Boggs (US) LLP (57) ABSTRACT

The exemplary embodiments of the invention relate to at least a method, computer program, and apparatus to transmit a beacon from a first access node to a first user terminal associated with the first access node and also to a second user terminal associated with a second access node, where the beacon includes information indicating a priority of the first access node with respect to a radio resource allocation, and receive feedback from the first user equipment associated with the first access node, where the feedback includes information indicating a priority of the second access node. Further, in accordance with the first embodiments there is adjusting a value of a priority of a wireless network access node over time depending on an amount of radio resources reserved for use by the wireless network access node, such that the priority value decreases as more radio resources are reserved and increases as fewer radio resources are reserved, and transmitting the value of the priority to at least one other wireless network access node. Additionally, the exemplary embodiments of the invention relate to receiving an identification of a radio resource from a serving access node, and transmitting an interfering signal that specifies the identified radio resource. In addition, exemplary embodiments of the invention include detecting at an access node, uplink interference in a radio resource, and releasing a radio resource identified by the radio resource in which uplink interference was detected for use by another access node.

18 Claims, 8 Drawing Sheets

(56) References Cited

U.S. PATENT DOCUMENTS

| | | |
|---|---|---|
| 2003/0012167 A1 | 1/2003 | Benveniste |
| 2003/0068975 A1 | 4/2003 | Qiao et al. |
| 2003/0139197 A1* | 7/2003 | Kostic et al. ............... 455/525 |
| 2003/0174664 A1* | 9/2003 | Benveniste ................ 370/317 |
| 2003/0186713 A1 | 10/2003 | Sugaya et al. |
| 2003/0218974 A1 | 11/2003 | Zuniga |
| 2004/0042394 A1* | 3/2004 | Nielsen et al. ............. 370/218 |
| 2004/0229621 A1* | 11/2004 | Misra .......................... 455/445 |
| 2005/0153703 A1 | 7/2005 | Juntti et al. |
| 2005/0249167 A1 | 11/2005 | Salokannel |
| 2006/0089099 A1* | 4/2006 | Buchwald et al. ......... 455/41.2 |
| 2006/0223574 A1* | 10/2006 | Chandra .................. 455/552.1 |
| 2007/0104164 A1* | 5/2007 | Laroia et al. ............... 370/338 |
| 2007/0117537 A1 | 5/2007 | Hui et al. |
| 2007/0189298 A1* | 8/2007 | Wong et al. ............... 370/395.1 |
| 2007/0253355 A1* | 11/2007 | Hande et al. ............... 370/328 |
| 2007/0253385 A1* | 11/2007 | Li et al. ....................... 370/338 |
| 2007/0287469 A1 | 12/2007 | Wijting et al. |
| 2008/0056201 A1 | 3/2008 | Bennett |
| 2008/0101359 A1* | 5/2008 | Storry et al. ................ 370/390 |
| 2008/0102849 A1 | 5/2008 | Neel et al. |
| 2008/0102852 A1* | 5/2008 | Du et al. ..................... 455/453 |
| 2008/0132233 A1 | 6/2008 | Li et al. |
| 2008/0214200 A1 | 9/2008 | Grandblaise et al. |
| 2008/0260000 A1 | 10/2008 | Periyalwar et al. |
| 2009/0040985 A1* | 2/2009 | Barnawi et al. ............. 370/336 |
| 2009/0046665 A1* | 2/2009 | Robson et al. .............. 370/332 |
| 2009/0059792 A1* | 3/2009 | Itoh ............................. 370/235 |

FOREIGN PATENT DOCUMENTS

| | | |
|---|---|---|
| WO | 02/41586 A2 | 5/2002 |
| WO | 2007/031960 A2 | 3/2007 |
| WO | 2007/047669 A1 | 4/2007 |
| WO | 2008090049 | 7/2008 |

OTHER PUBLICATIONS

"3rd Generation Partnership Project; Technical Specification Group Radio Access Network; Requirements for Further Advancements for E-UTRA (LTE-Advanced) (Release 8)", 3GPP TR 36.913, v8.0.0, Jun. 2008, pp. 1-14.

International Search Report and Written Opinion received for corresponding Patent Cooperation Treaty Application No. PCT/IB2009/007339, dated Mar. 29, 2010, 15 pages.

Hu et al., "Radio Resource Management for Cooperative Wireless Communication Systems With Organized Beam-Hopping Techniques", IEEE Wireless Communications, vol. 15, Issue 2, Apr. 2008, pp. 100-109.

U.S. Appl. No. 61/198,341, "Priority Based Mechanism to Achieve Fairness in FSU Resource Sharing", filed Nov. 5, 2008, 21 pages.

Auer et al. "Winner II System Concept Description", IST-4-027756 Winner II, D6.13.14, v1.1, Jan. 18, 2008, pp. 1-172.

Non-Final Office Action received for corresponding U.S. Appl. No. 12/291,071, dated May 14, 2010, 24 pages.

"E-UTRA Downlink Control Signaling—Overhead Assessment", TSG-RAN WG1 #44, R1-060573, Agenda Item: 13.1.3, Denver, CO, USA, Feb. 13-17, 2006, 7 pages.

Final Office Action received for corresponding U.S. Appl. No. 12/291,071, dated Aug. 19, 2010, 24 pages.

"Improved Coexistence Mechanisms for License-Exempt Operation", Part 16: Air Interface for Fixed and Mobile Broadband Wireless Access Systems, Draft Amendment to IEEE Standard for Local and Metropolitan Area Networks, IEEEP802.16/h/D7a, Jun. 22, 2008, 237 pages.

Non-Final Office Action received for corresponding U.S. Appl. No. 12/291,071, dated Apr. 15, 2011, 23 pages.

Final Office Action received for corresponding U.S. Appl. No. 12/291,071, dated Oct. 5, 2011, 22 pages.

Non-Final Office Action received for corresponding U.S. Appl. No. 12/291,071, dated May 24, 2012, 24 pages.

Final Office Action received for corresponding U.S. Appl. No. 12/291,071, dated Dec. 4, 2012, 22 pages.

International Search Report and Written Opinion received for corresponding Patent Cooperation Treaty Application No. PCT/IB2009/007340, dated Mar. 2, 2010, 12 pages.

Cao et al., "Distributed Rule-Regulated Spectrum Sharing", IEEE Journal on Selected Areas in Communications, vol. 26, Issue 1, Jan. 2008, pp. 130-145.

Office Action received for corresponding Chinese Application No. 200980144269.4, dated Apr. 24, 2013, 11 pages.

Office Action received for corresponding Chinese Application No. 200980144269.4, dated Feb. 24, 2014, 6 pages.

Office Action received for corresponding Chinese Application No. 200980144269.4, dated Oct. 10, 2013, 14 pages.

\* cited by examiner

PRIORITY-BASED FAIRNESS AND INTERFERENCE SIGNALLING TECHNIQUE IN A FLEXIBLE SPECTRUM USE WIRELESS COMMUNICATION SYSTEM

RELATED APPLICATION

This application was originally filed as PCT Application No. PCT/IB2009/007339 filed on Nov. 5, 2009 and claims priority to U.S. Provisional Application No. 61/198,316, which is incorporated herein by reference in its entirety.

TECHNICAL FIELD

The exemplary and non-limiting embodiments of this invention relate generally to wireless communication systems, methods, devices and computer programs and, more specifically, relate to wireless communication system that may use uncoordinated spectrum deployments, possibly in combination with flexible spectrum usage.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ADSL asymmetric digital subscriber line
AP access point (base station)
BS base station
BW bandwidth
DL downlink (as an example an AP towards a UE)
eNB EUTRAN Node B (evolved Node B)
EPC evolved packet core
EUTRAN evolved UTRAN (LTE)
FDD frequency division duplex
FSU flexible spectrum use
LTE long term evolution
MAC medium access control
MM/MME mobility management/mobility management entity
MS mobile station
OFDMA orthogonal frequency division multiple access
PDCP packet data convergence protocol
PDU protocol data unit
PHY physical
RACH random access channel
RB resource block
RLC radio link control
RRC radio resource control
SGW serving gateway
TDD time division duplex
UE user equipment
UT user terminal
UL uplink (as example a UE towards an AP)
UTRAN universal terrestrial radio access network The specification of a communication system known as evolved UTRAN (EUTRAN, also referred to as UTRAN LTE or as EUTRA) has been considered within the 3GPP. As specified the DL access technique is OFDMA, and the UL access technique is SC-FDMA (single carrier, frequency division multiple access).

One specification of interest in this regard is 3GPP TS 36.300, V8.5.0 (2008 May), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), which is incorporated by reference herein in its entirety. This system may be referred to for convenience as LTE Rel-8, or simply as Rel-8. Note that this is a stage 2 specification, and may not exactly describe the system as currently implemented. In general, the set of specifications given generally as 3GPP TS 36.xyz (e.g., 36.211, 36.311, 36.312, etc.) may be seen as describing the entire Release 8 LTE system.

Of particular interest herein are the discussions of 3GPP LTE which have been targeted towards IMT-A systems, referred to herein for convenience simply as LTE-Advanced (LTE-A). Of additional interest herein are local area (LA) deployment scenarios using a scalable bandwidth (of up to, for example, 100 MHz) with flexible spectrum use (FSU). This system concept may be referred to herein for convenience as LTE-A.

FSU generally refers to any spatially and/or temporally varying use of radio spectrum/radio resources. As a non-limiting example, FSU enables networks of different operators to operate on a same radio spectrum (using the same shared radio resources). FSU allows a plurality of operators to collectively utilize a frequency band such that there are no dedicated portions licensed to a single operator. The frequency band may still be licensed, however regulatory rules will dictate how bandwidth sharing is executed. This allows each operator to adjust its frequency use according to local needs such that the scarce spectrum is more efficiently utilized than in non-FSU models (e.g., the current regulation model). FSU may also be applied on an unlicensed band, though the flexible spectrum use would still have to be regulated so that the networks can reliably operate.

FSU creates a framework for a flexible and dynamic use of radio resources for enabling network operators to have access to the resources. A goal is to utilize the spectrum in an as optimal way as possible in order to achieve a high use flexibility of the radio resources, such as radio frequencies.

The FSU concept for Release 10 of LTE may have been considered a distributed FSU scheme, i.e., there may be no FSU server to control the resource assignments. One important concept of distributed FSU is local awareness, the goal of which is to gain an understanding of spectrum situation/opportunities in a region (neighbourhood), in order to self-organize flexible spectrum use. Local awareness can include information of neighbouring nodes, including possibly their future intentions.

In FSU it can be expected that several APs (and UEs) can use the same shared radio resource pool. If the neighbouring APs are far from each other this can be readily accomplished as interference issues do not arise. However, in a realistic setting the neighbouring APs can be located close to one another so that interference issues do arise. It may be the case that one of the involved APs needs to make room for another AP, and either completely relinquish some shared resources or at least reduce its transmission power on those resources.

A problem that arises in this context is how to settle these situations and decide (in a fair manner) which of the APs has the right to use the shared radio resources in question.

Another question is how to best indicate to the other AP the intention of the AP to begin using a radio resource that the AP has reserved.

Figure 1:
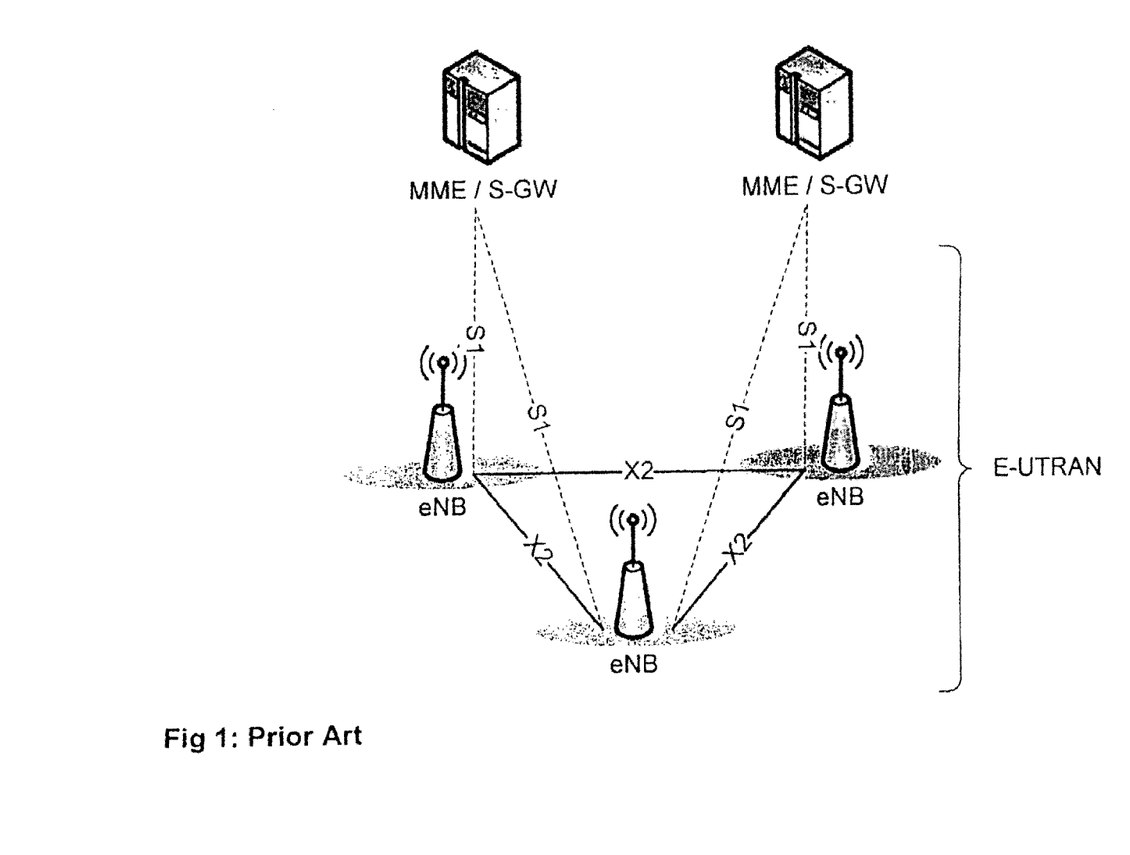
FIG. 1 reproduces FIG. 4 of 3GPP TS 36.300, and shows the overall architecture of the EUTRAN system.

In LTE, radio resource management is arranged within a single network and utilizes the X2 interface between base stations (eNBs). Reference in this regard may be made to FIG. 1, which reproduces FIG. 4.1 of 3GPP TS 36.300, and shows the overall architecture of the EUTRAN (LTE) system. The EUTRAN system includes eNBs that provide the EUTRA user plane (PDCP/RLC/MAC/PHY) and control plane (RRC) protocol terminations towards the UE. The eNBs are interconnected with each other by means of the above-mentioned X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

However, the inter-access point interface does not exist when cells belong to different networks, or are based on an ADSL backbone (femto BS).

The exemplary embodiments of the invention relate to how to most efficiently and fairly use an FSU wireless communication system. In addition, the exemplary embodiments of the invention relate to control signalling that is an element of an efficient FSU implementation.

SUMMARY

In an exemplary aspect of the invention, there is a method comprising transmitting a beacon from a first access node to a first user terminal associated with the first access node and also to a second user terminal associated with a second access node, where the beacon includes information indicating a priority of the first access node with respect to a radio resource allocation, and receiving feedback from the first user equipment associated with the first access node, where the feedback includes information indicating a priority of the second access node. In an exemplary aspect of the invention, there is an apparatus comprising at least one processor, and at least one memory including computer program code, where the at least one memory and the computer program code are configured, with the at least one processor, to cause the apparatus to at least transmit a beacon from a first access node to a first user equipment associated with the first access node and also to a second user equipment associated with a second access node, where the beacon includes information indicating a priority of the first access node with respect to a radio resource allocation, and receive feedback from the first user equipment associated with the first access node, where the feedback includes information indicating a priority of the second access node.

In another exemplary aspect of the invention, there is a method comprising adjusting a value of a priority of a wireless network access node over time depending on an amount of radio resources reserved for use by the wireless network access node, such that the priority value decreases as more radio resources are reserved and increases as fewer radio resources are reserved, and transmitting the value of the priority to at least one other wireless network access node.

In another exemplary aspect of the invention, there is an apparatus comprising at least one processor, and at least one memory including computer program code, where the at least one memory and the computer program code are configured, with the at least one processor, to cause the apparatus to at least adjust a value of a priority of a wireless network access node over time depending on an amount of radio resources reserved for use by the wireless network access node, such that the priority value decreases as more radio resources are reserved and increases as fewer radio resources are reserved, and transmit the value of the priority to at least one other wireless network access node.

In an exemplary aspect of the invention, there is a method comprising receiving an identification of a radio resource from a serving access node, and transmitting an interfering signal that specifies the identified radio resource.

In another exemplary aspect of the invention, there is an apparatus comprising at least one processor, and at least one memory including computer program code, where the at least one memory and the computer program code are configured, with the at least one processor, to cause the apparatus to at least receive an identification of a radio resource from a serving access node, and transmit an interfering signal that specifies the identified radio resource.

In still another exemplary aspect of the invention, there is a method comprising detecting at an access node, uplink interference in a radio resource, and releasing a radio resource identified by the radio resource in which uplink interference was detected for use by another access node.

In yet another exemplary aspect of the invention, there is an apparatus comprising at least one processor, and at least one memory including computer program code, where the at least one memory and the computer program code are configured, with the at least one processor, to cause the apparatus to at least detect at an access node uplink interference in a radio resource, and release a radio resource identified by the radio resource in which uplink interference was detected for use by another access node.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Reference may be made to commonly owned U.S. patent application Ser. No. 12/291,071, filed on Nov. 5, 2008, entitled "Automated Local Spectrum Usage Awareness", by Antti S. Sorri, Jari P. Lundén and Elena Virtej. This US Patent Application describes the use of beaconing from access points/nodes, and beacon-related feedback from user terminals, that facilitates achieving local awareness at the access points.

Reference can also be made to 3GPP TR 36.913, V8.0.0 (2008 June), 3rd Generation Partnership Project; Technical Specification Group Radio Access Network; Requirements for Further Advancements for E-UTRA (LTE-Advanced) (Release 8), incorporated by reference herein in its entirety.

The exemplary embodiments of the invention are related at least in part to a distributed FSU type of wireless communication system. More specifically, aspects of these exemplary embodiments relate to a priority-based fairness mechanism for use in the FSU wireless communication system and to control signalling that is an element of an efficient FSU implementation.

Figure 2A:
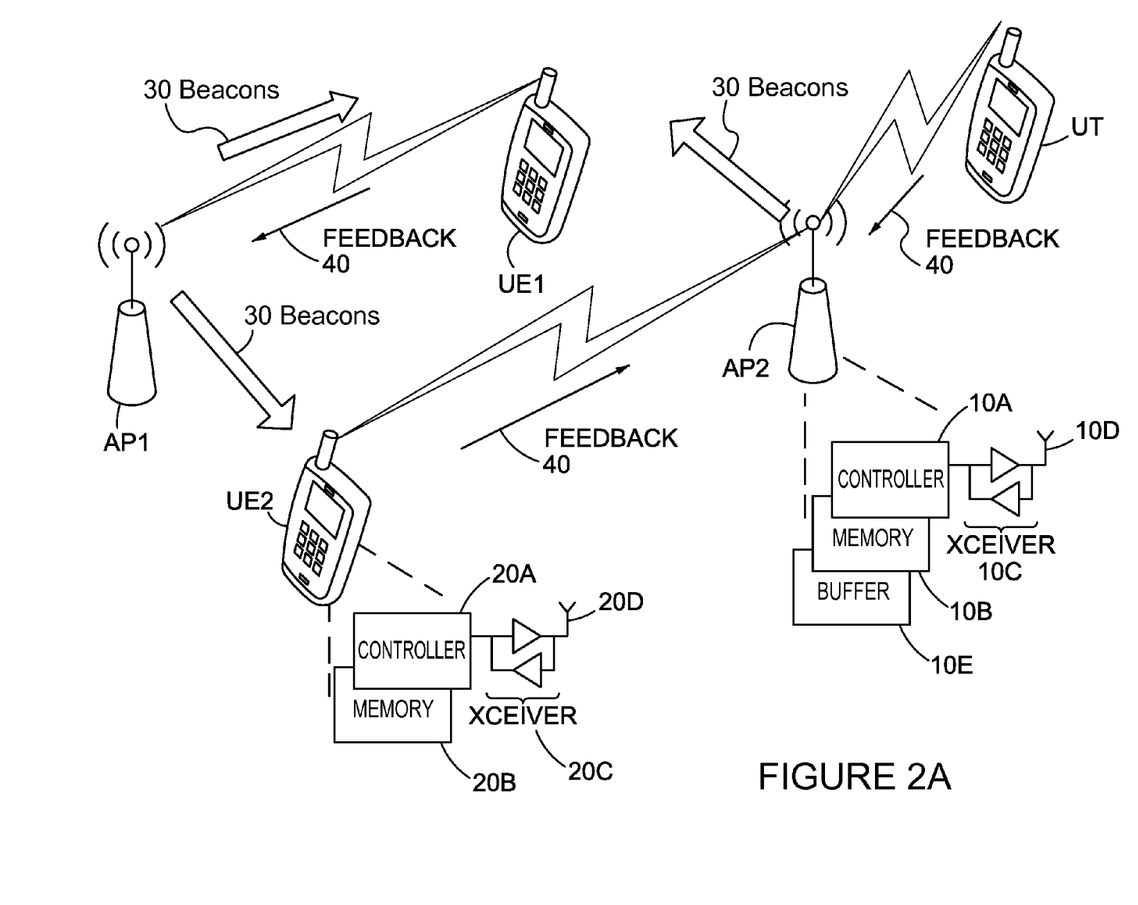
FIGS. 2A and 2B show a simplified block diagram of various electronic devices that are suitable for use in practicing the exemplary embodiments of this invention.
Figure 2B:
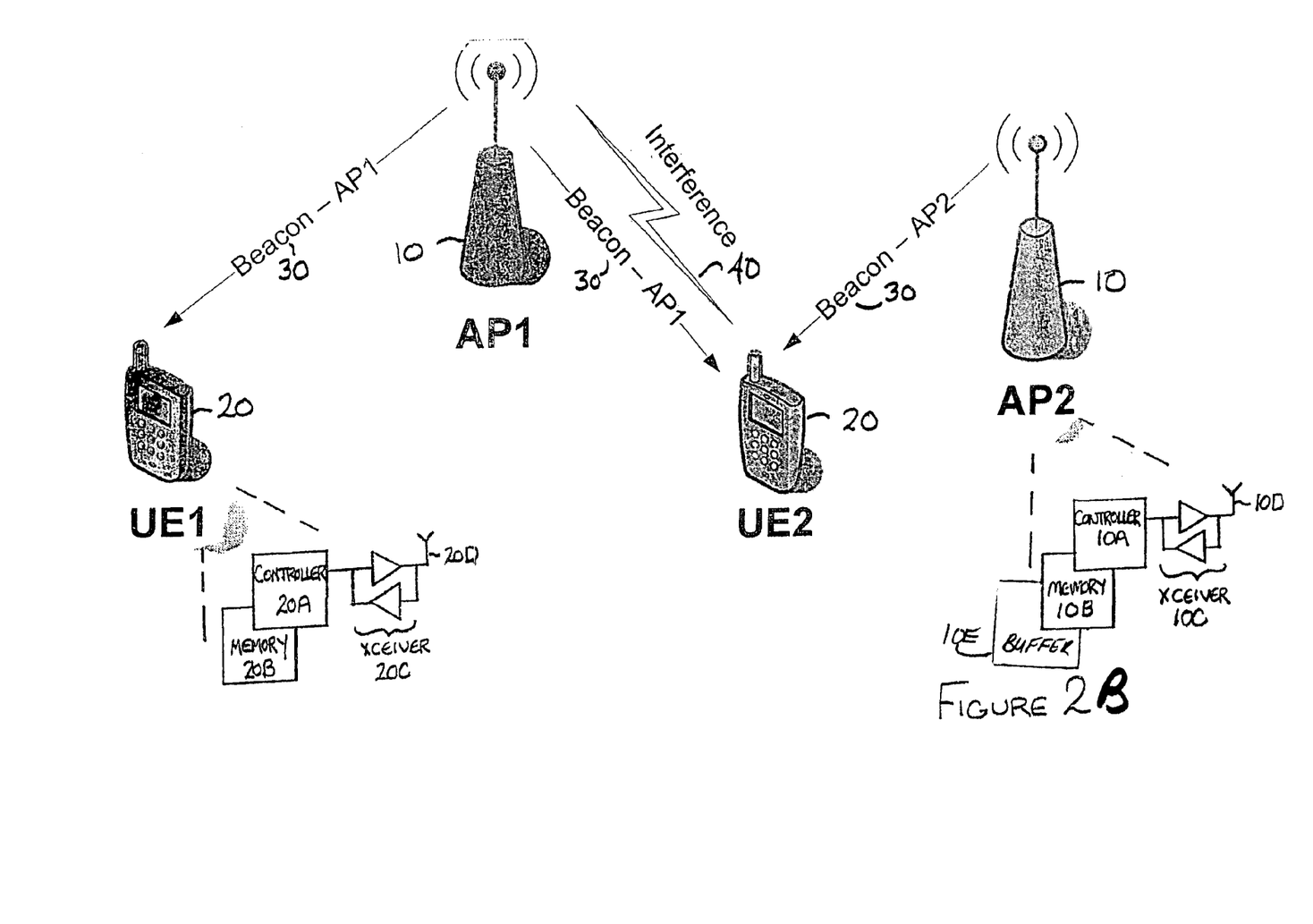

Reference can be made to FIGS. 2A and 2B which shows a plurality of access points (AP) and user equipment (UE). The AP1 and AP2, each of which may also be referred to without a loss of generality as an access node (AN) or as a base station (BS), may be associated with different radio access networks, and may be considered as neighbors, enabling a single user equipment, such as a UE1 or UE2, to receive transmissions from its own AP as well as from a neighboring AP. The user equipment, such as the UE1 and UE2, may also be referred to, without a loss of generality, as mobile nodes (MN), or as user terminals (UT), or as mobile stations (MS). The access points, such as for example the AP2, will generally include at least one controller, such as for example the Controller 10A, may include at least one data processor, possibly a digital signal processor (DSP), at least one memory 10B and at least one radio frequency or other type of wireless transceiver 10C for connection with at least one antenna 10D. The memory 10B, which may be viewed as a computer-readable memory medium, stores in part computer program instructions that when executed enable an Access Point, such as the AP2, to function in accordance with the exemplary embodiments of this invention. The memory 10B may also be assumed to store a data buffer 10E. The UEs will also generally include, as an example in the UE1, at least one controller 20A, such as at least one data processor, possibly a DSP, at least one memory 20B and at least one radio frequency or other type of wireless transceiver 20C for connection with at least one antenna 20D. The memory 20B, which may also be viewed as a computer-readable memory medium, stores in part computer program instructions that when executed enable the UE1 to function in accordance with the exemplary embodiments of this invention.

In FIGS. 2A and 2B at least one Access Point, such as the AP1, is assumed to be associated with a first network, while another Access Point and/or User Equipment, such as the AP2 or UE2, may be assumed to be associated with a second, different network. Each Access Point, such as AP1 and AP2, may be assumed to establish a cell that defines the communication coverage area associated with the particular Access Point. The cells may be considered in some embodiments to be pico cells or femto cells, i.e., cells having smaller coverage areas than cells associated with conventional cellular communication systems (which may have dimensions measured in kilometers or tens of kilometers).

The exemplary embodiments of this invention may be utilized with broadcast control information (possibly transmitted in-band) that may be used in part to locally monitor the spectrum usage situation. Broadcast messages, also referred to herein as beacons 30, are received by user equipment, such as the UE1 and/or UE2, of the same network, as well as by UEs belonging to different, neighboring networks. Each UE may further make and process measurements to create an understanding of the current spectrum usage situation in the current location of a UE, such as the UE1 or UE2. In a non-limiting example, as illustrated in FIG. 2A, the UE2 transmits feedback 40 to its own AP2 in order to create awareness of the spectrum usage over the entire cell.

The transmission of the broadcast control information "in-band" implies that the broadcast control information, referred to herein for convenience as the beacon 30, is transmitted in a same frequency band that is used for transmitting communication data from an access point to the user terminals. Note, however, that in other embodiments the beacon 30 could be transmitted out-of-band, i.e., in a frequency band not used for transmitting control data to the user terminals. The following aspects of the exemplary embodiments of the invention are described, in part, with reference to FIGS. 2A and 2B. It is noted that these FIGS. 2A and 2B are non-limiting and any implementation of the exemplary embodiments of the invention, as described herein, are not limited to the devices or operations as illustrated in at least these figures.

Priority Based Technique to Achieve Fairness

In accordance with a first aspect of the exemplary embodiments of the invention and referring to FIG. 2A, each AP, such as an AP1, is assumed to have a priority which can be used to resolve a situation where several APs desire to use the same radio resources. The priority of a particular other AP, such as an AP2, should be known to the other APs 2 at least to some degree to allow meaningful decision making based on resource usage and sharing. To ensure fair access to the resources, the priorities are preferably updated based on some commonly agreed rules that are followed by all the APs.

As employed herein a radio resource can include, as non-limiting examples, one or more of frequency channels, time slots and/or spreading codes, as well as the use of some resource, such as a frequency channel, for some certain duration, depending on the specifics of the underlying radio access technology.

To achieve the priority-based sharing of radio resources by the APs, such as AP1 or AP2, the exemplary embodiments of this invention provide that information descriptive of the APs is broadcast in the network (e.g., using a FSU-specific beacon 30) from each AP1 or AP2. In accordance with the Exemplary embodiments of the invention a nearby UE, such as the UE1 or UE2, is enabled to receive the priority information and relay it as the feedback 40 to its own associated AP. Optionally, the UE, such as the UE1 and UE2, may also forward the priority of their own AP to one or more other (foreign) APs.

In addition, in accordance with the exemplary embodiments of the invention a higher priority AP, such as may be the AP1 or the AP2, can take (within limits) resources from a lower priority AP. Such limits can require that no AP, no matter how low its priority, be left with no radio resources.

Any free or unreserved resources may be taken regardless of AP priority. Further, in accordance with the exemplary embodiments of the invention the priorities may be defined so that there is a penalty for reserving more resources than are actually needed by the AP. For example, the more resources that are reserved for use and/or actually utilized by an, such as the AP1 or AP2, has the effect of lowering its priority proportionately. This type of operation is designed to prevent excessive resource reservation (e.g., greedy resource reservation) by the APs. From this it follows that if two APs are close enough to one another to interfere with one another, at least one of them should be aware of the priority of the other. If both AP1 and AP2 know the priority of the other, the AP with the lower priority follows the higher priority AP's resource reservation and, if needed, releases some of its resources and/or decreases the interference, such as by reducing its transmitter output power. Alternatively, if only one of AP1 and AP2 is aware of the priority of the other, it may deduce which one has the right to use certain resources. Consequently, it can notify the other AP1 or AP2 via one of its UEs, such as UE1 or UE2, if the other AP needs to release resources (due to lower priority).

The use of these exemplary embodiments of the invention avoids a "greedy player" (AP) situation. For example, if one of AP1 or AP2 needs to acquire additional radio resources (e.g., in order to quickly finish transmitting buffered data), the priority of the AP is broadcast on the beacon 30, which may then be communicated to other APs in the system either directly (AP-AP transmission) or indirectly via a UE, such as the UE1 or UE2. Based on this information, the requesting AP is either granted the right to acquire additional resources, or is not granted this right.

To illustrate the benefits that are achieved by the use of the exemplary embodiments of this invention, the priority-based fairness mechanism for FSU was implemented in a quasi-static system simulator. The simulator contains the basic FSU framework based on AP beacons 30, and includes the priority mechanism described above. The following example, which illustrates the fairness mechanism, is described in conjunction with FIGS. 3 and 4. The data is directly gathered from the system simulator.

Figure 3:
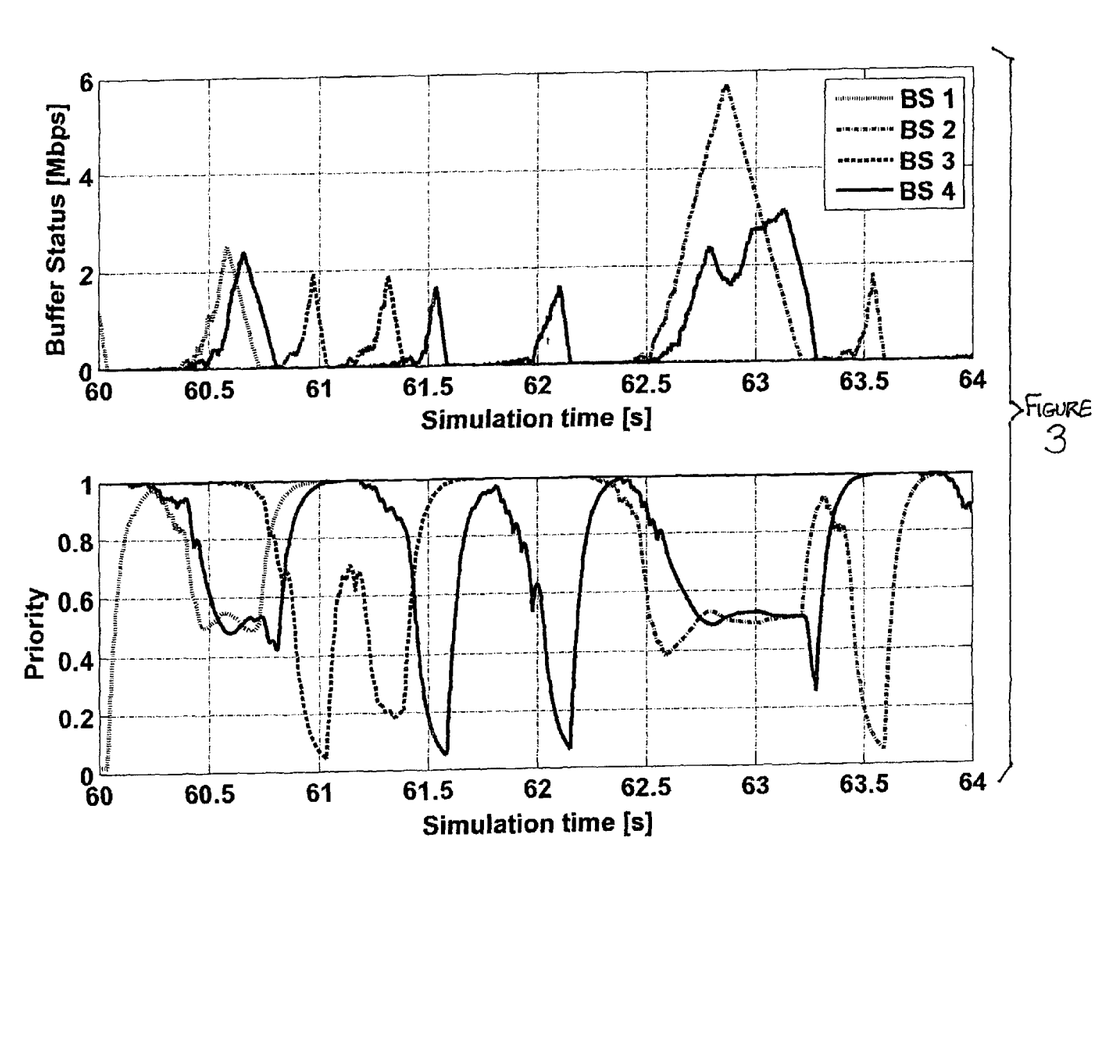
FIG. 3 illustrates graphs showing buffer status (i.e., how many bits there are in an Access Point buffer (AP)) versus priority, for four different APs over a simulation interval (e.g., 64 seconds).
Figure 4:
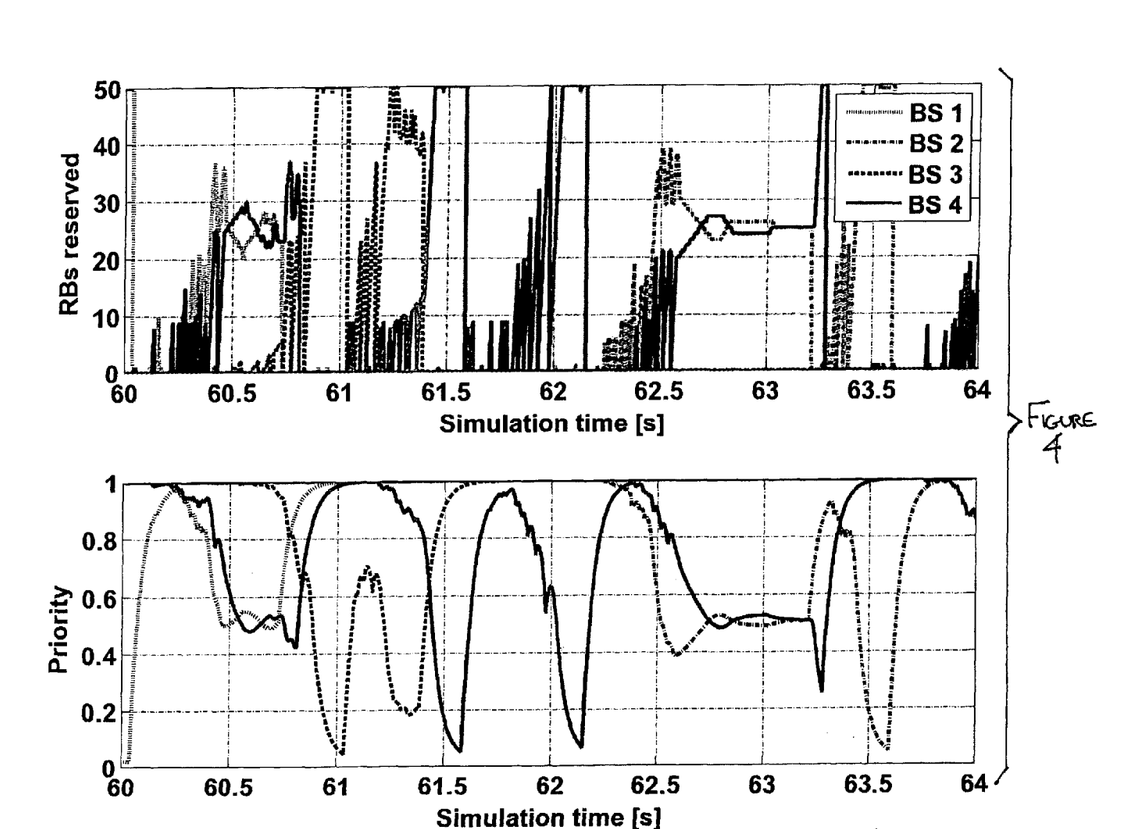
FIG. 4 illustrates graphs showing resource blocks (RBs) reserved versus priority, for the four different APs over the same simulation interval.

In the example shown in FIG. 3 and in FIG. 4 the priority computation is based on an average amount of resources reserved in the past. The averaging window for the FSU priority creates a quick and dynamic change in the resource reservation. One non-limiting example of the priority metric that was used in the simulation has the form shown in Equation 1 (it being noted that the priority metric may take other forms):

$$pr(t+1) = \alpha \cdot pr(t) + (1-\alpha) \cdot \left(1 - \frac{\text{\# reserved\_RBs}}{\text{\# total\_RBs}+1}\right), \quad (1)$$

where the variables appearing in Equation 1 are defined as shown in the Table below.

| Variable | Meaning |
| --- | --- |
| pr | Priority metric example |
| t | Time unit |
| α | Weighting factor (or forgetting factor) |
| RBs | Resource blocks (smallest allocable radio resource units) |

In FIG. 3 it is shown that the buffer 10E status is related to the priority behaviour, as a function of simulation time (64 seconds as a non-limiting example). During a similar time frame, FIG. 4 shows the resource block (RB) allocation (RBs reserved) related to the priority metric behaviour. One may observe that when high traffic it is expected (or there is some relatively large amount of data buffered in the AP for transmission), many resources are required. The value of the priority metric decreases in time once the resources are given/reserved for use. This event triggers almost immediately a lowering in the number of RBs reserved for that particular AP.

In a case where there is more than one AP with high traffic in the same time frame, the system converges towards an even share allocation of the radio resources between the APs.

There are a number of advantages and technical effects that are realized by the use of these exemplary embodiments. For example, greediness of an operator/AP in the system is avoided. Further by example, there is provided a fairness mechanism to distribute the radio resources. Further by example, it becomes possible to achieve a fast and dynamic change of resource allocations between the APs. Further by example, the priority-based resource sharing technique can be used for both short term and long term radio resource allocations. In addition, the priority-based resource sharing technique can be applied to any local or wide area type of environment (or for resource sharing between local and wide area network environments). In addition, the priority-based resource sharing technique can be applied regardless of the characteristics of the underlying radio access networks (e.g., it may be used in either TDD or FDD (or TDD/FDD) types of systems). Still further, the priority-based resource sharing technique can be used to allow a FSU-based communication network to determine in a distributed manner who can use certain radio resources.

The use of the exemplary embodiments also clearly benefit uncoordinated deployments of self-organizing flexible spectrum use, and facilitate providing a degree of automated network optimization for the system.

Based on the foregoing it should be appreciated that in accordance with the first aspect of these exemplary embodiments of the invention there is providing a local awareness scheme that enables priority-based resource sharing between network access nodes to facilitate self-organizing flexible spectrum use.

In addition, based on the foregoing it should be apparent that the exemplary embodiments of this invention provide a method, apparatus and computer program(s) to provide resource sharing based on a flexible and dynamic adjustment of priorities amongst a plurality of network access nodes of a wireless communication system.

Figure 5:
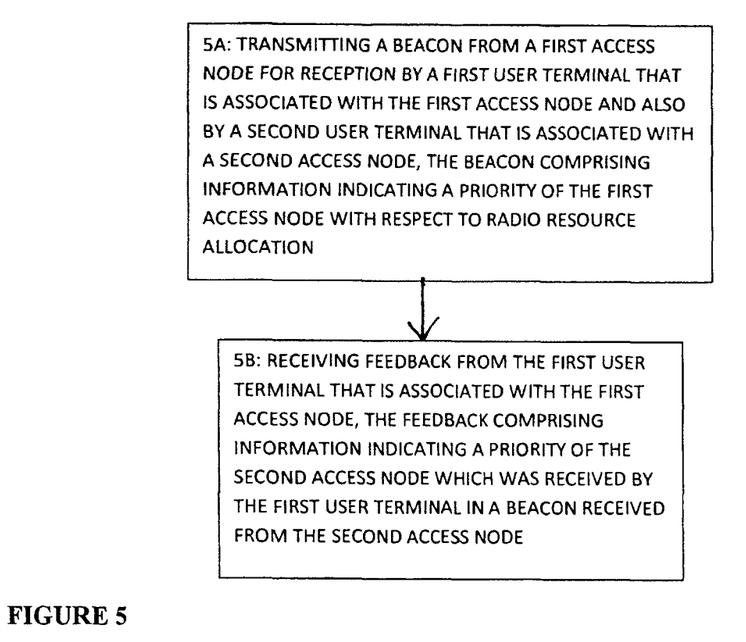
FIGS. 5, 6, 7, and 8 are logic flow diagrams that each illustrates an operation of a method, and a result of execution of computer program instructions embodied on a computer readable memory, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 5A, a step of transmitting a beacon from a first access node for reception by a first user terminal that is associated with the first access node and also by a second user terminal that is associated with a second access node, the beacon comprising information indicating a priority of the first access node with respect to radio resource allocation. The method further performs, at Block 5B, a step of receiving feedback from the first user terminal that is associated with the first access node, the feedback comprising information indicating a priority of the second access node which was received by the first user terminal in a beacon received from the second access node.

In the method of the preceding paragraph, where the first access node relinquishes radio resources if the second access node has a higher priority and has a need for additional radio resources.

In the method of the preceding paragraphs, where the priority of the first access node has a value that changes over time depending on an amount of radio resources reserved by the first access node, such that the priority value decreases as the first access node reserves more radio resources, and increases as the first access node reserves fewer radio resources.

Figure 6:
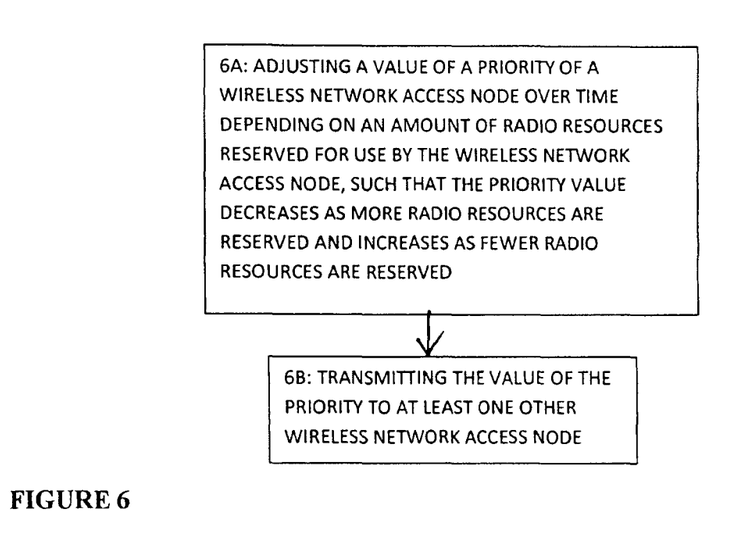

FIG. 6 is a logic flow diagram that illustrates the operation of a method, and a result of execution of computer program instructions, in accordance with the exemplary embodiments of this invention. In accordance with these exemplary embodiments a method performs, at Block 6A, a step of adjusting a value of a priority of a wireless network access node over time depending on an amount of radio resources reserved for use by the wireless network access node, such that the priority value decreases as more radio resources are reserved and increases as fewer radio resources are reserved; and at Block 6B, a step of transmitting the value of the priority to at least one other wireless network access node.

In the method of the preceding paragraph, where the step of transmitting takes place via a wireless network mobile node.

The various blocks shown in FIGS. 5 and 6 may be viewed as method steps, and/or as operations that result from operation of computer program code, and/or as a plurality of coupled logic circuit elements constructed to carry out the associated function(s).

The exemplary embodiments of this invention also provide an apparatus that comprises a controller configured to operate with a wireless transmitter and a wireless receiver to transmit a beacon for reception by a first user terminal that is associated with the apparatus and also to a second user terminal that is associated with a second apparatus, and to receive feedback from the first user terminal that is associated with the apparatus. The beacon comprises information indicating a priority of the first apparatus, or access node, with respect to radio resource allocation, and the received feedback comprises information indicating a priority of the second apparatus, or access node, which was received by the first user terminal in a beacon received from the second apparatus.

In the apparatus of the preceding paragraph, where the first apparatus relinquishes radio resources if the second apparatus point has a higher priority and has a need for additional radio resources. In the apparatus of the preceding paragraphs, where the priority of the first apparatus has a value that changes over time depending on an amount of radio resources reserved by the first apparatus, such that the priority value decreases as the first apparatus reserves more radio resources, and increases as the first apparatus reserves fewer radio resources.

Uplink Interference Signaling in Flexible Spectrum Use System

Furthermore, in accordance with a second aspect of the exemplary embodiments of the invention and referring to FIG. 2B, it is assumed that each AP, such as AP1 and AP2, is aware of its right to use certain radio resources over another AP (this is governed by the FSU, e.g., via a priority based scheme, where priorities may be possibly communicated via the beacons 30 as well). As the FSU scheme is distributed, one may assume that there is no reliable connection directly between AP1 and AP2 (e.g., no connections such as the X2 interface of the LTE system shown in FIG. 1).

Reference with regard to the AP priorities and priority signalling may be made to commonly owned U.S. Provisional Patent Application No. 61/198,341 filed on Nov. 5, 2008, and entitled "Priority Based Technique to Achieve Fairness for Radio Resource Sharing", by Elena Virtej, Jari P. Lundén and Antti S. Sorri.

As employed herein a radio resource can include, as non-limiting examples, one or more of frequency channels, time slots and/or spreading codes, as well as the use of some resource, such as a frequency channel, for some certain duration, depending on the specifics of the underlying radio access technology. Radio resources may be partitioned into resource blocks (RBs) each comprising, for example, some amount of frequency spectrum, or time and frequency spectrum, etc.

In a FSU system the scenario depicted in FIG. 2B may be likely to occur. In FIG. 2B one may assume that AP1 is serving UE1 and AP2 is serving UE2. The beacon 30 of AP2 is received only by UE2, whereas the beacon 30 of AP1 is received by both UE1 and UE2. Furthermore, one may assume that UE2 is physically located in proximity to the "foreign" (non-serving) AP1 that it can be interfered by it if AP1 and AP2 are using the same radio resources for their respective transmissions. In this case, and if one assumes that AP2 has priority over AP1 for at least some of the shared resources, it cannot directly signal AP1 to release the resources as AP1 (and UE1) do not receive the beacon 30 transmitted by AP2. The exemplary embodiments of this invention provide a novel solution to this problem of how to arrange the signalling related to the requested resource release by AP1.

In the exemplary embodiments of this invention this signalling problem is solved without requiring the use of explicit signalling between UE2 and the non-serving AP1. More specifically, the problem is solved through the use of UL interference for signalling.

For example, in the situation depicted in FIG. 2B and described above, AP2 may instruct UE2 to cause UL interference 40 on the resource or resources that AP2 wants AP1 to release for its use. Note that AP2 can have knowledge of the resources used by AP1 due to the fact that UE2 receives the beacon 30 of AP1, and in the beacon 30 may be an indication of the resources currently reserved for use by AP1. This information can be transmitted from UE2 to its serving AP2 as part of a feedback signal.

In any event, upon observing the interference generated by UE2, and not having knowledge of the source of the interference, AP1 may assume that the interference was generated intentionally to indicate that another AP, with a higher priority, wants to use the interfered-with resource(s). In this case, then, AP1 releases the interfered-with resources to enable AP2 to reserve same for its own use.

In accordance with these exemplary embodiments it is desirable that the same resources are reserved for both UL and DL (in TDD), that is, there are no separate resource reservations for the UL and the DL. This assumption is not overly restrictive, as a flexible split between the UL and the DL can be achieved by adjusting a TDD switching point. Note that this assumption forms the basis for a correct interpretation of the UL interference signalling, i.e., that the interfered-with resource(s) are needed by another AP and thus should be released.

Note that for a FDD deployment there may be a fixed mapping between UL and DL resources. In this manner if the AP1 receives an interfering signal in UL resource A, it can map this interfering signal to DL resource B, and thus identify the resource to be released.

Further, it may be assumed that if a UE2 can be severely interfered with in the DL by an AP1, then it is capable of causing a noticeable amount of interference in the UL of that same AP1. This assumption is reasonable to make, in particular for the TDD case, where the UL and DL will have similar propagation characteristics due to the same frequencies being used for the UL and the DL. In the implementation of these exemplary embodiments of the invention it is assumed that the AP1 is capable of instructing the UE2 to cause UL interference in an indicated resource. This can be achieved by providing an instruction in a DL signalling channel and/or by including the instruction in a DL beacon 30.

In the implementation of these exemplary embodiments of the invention it is further assumed that a UE, such as the UE2, is capable of generating a detectable amount of interference on an identified UL radio resource. This can be achieved, for example, by the UE1 tuning its transmitter to an identified frequency and transmitting a burst or a continuous signal, such as an unmodulated tone, or a signal containing some predetermined bit sequence (e.g., all ones, all zeros, etc.) In a time/frequency type of system the UE2 can transmit on an identified frequency at one or more discrete time periods (time slots).

In the implementation of these exemplary embodiments it is further assumed that an AP, such as the AP1, is capable of monitoring its receiver for the presence of UL interference on the resources used by it, and upon detecting an increased amount of interference to take the desired action, such as indicating in its DL beacon that it has relinquished the identified resource(s). The use of an AP 1 timer and/or thresholds may be employed. For example, interference may be declared to be detected if it is present for at least some predetermined period of time (to discriminate against impulse noise and the like) and if it exceeds some predetermined threshold level.

There are a number of advantages and technical effects that are realized by the use of these exemplary embodiments. For example, the use of these exemplary embodiments avoids a need to define explicit signalling between the UE20 and a foreign AP1 (e.g., no RACH or similar arrangement would be required for this purpose). Furthermore, even if a RACH or some other explicit way of signalling is present, the exemplary embodiments may be used as a backup approach if for some reason the primary signalling technique (e.g., use of the RACH) is unreliable.

The use of the exemplary embodiments also clearly benefit uncoordinated deployments of self-organizing flexible spectrum use, and facilitate providing a degree of automated network optimization for the system.

Based on the foregoing it should be apparent that the exemplary embodiments of this invention provide methods, apparatus and computer program(s) to achieve UE-AP signalling to facilitate a rapid identification and release of radio resources to a higher priority AP.

Figure 7:
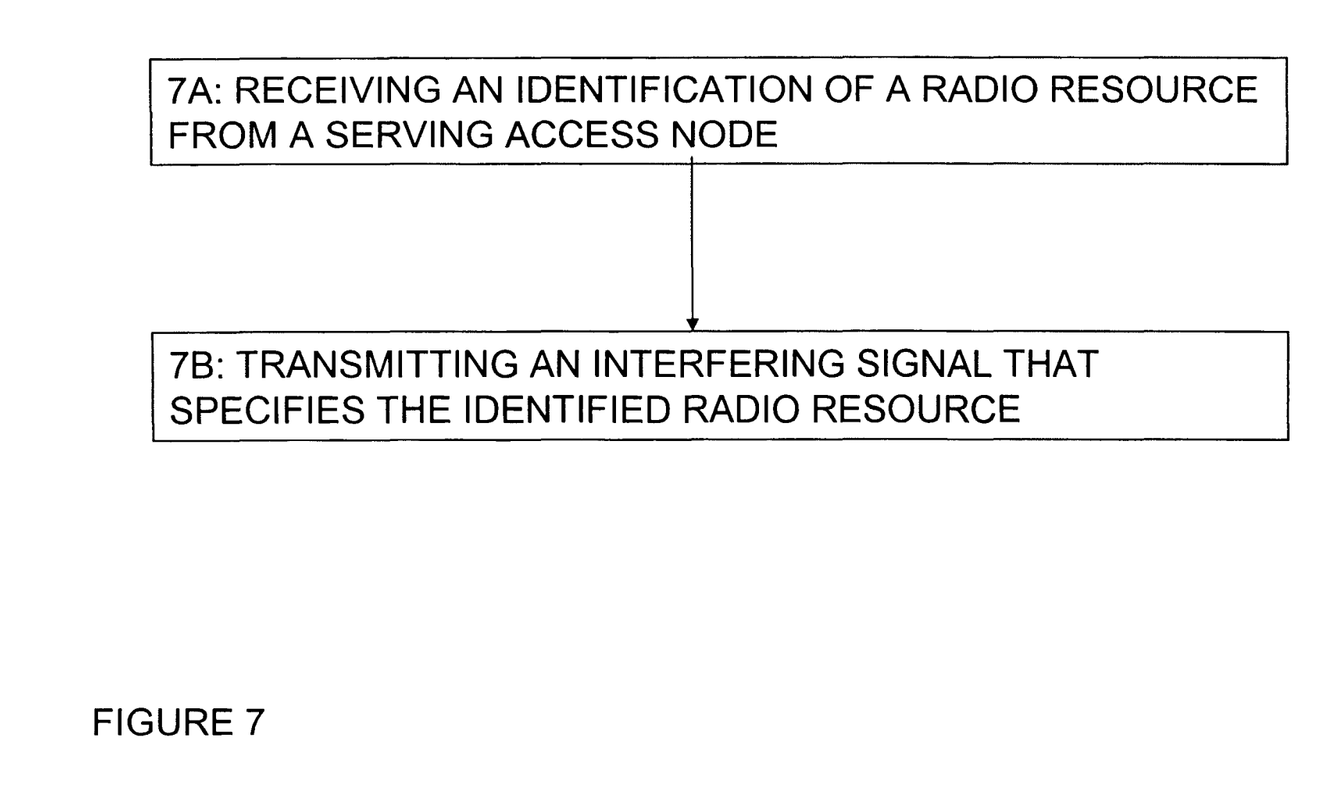

FIG. 7 is a logic flow diagram that illustrates the operation of a method, and a result of execution of computer program instructions, in accordance with the exemplary embodiments of this invention. In accordance with these exemplary embodiments a method performs, at Block 7A, a step of receiving an identification of a radio resource from a serving access node and, at Block 7B, a step of transmitting an interfering signal that specifies the identified radio resource. In the method of the preceding paragraph, where the identified radio resource is one reserved for use by another, non-serving access node.

In the method of the preceding paragraphs, where the step of transmitting transmits the interfering signal in the identified radio resource, or transmits the interfering signal in a radio resource that is predetermined to map onto the identified radio resource.

Figure 8:
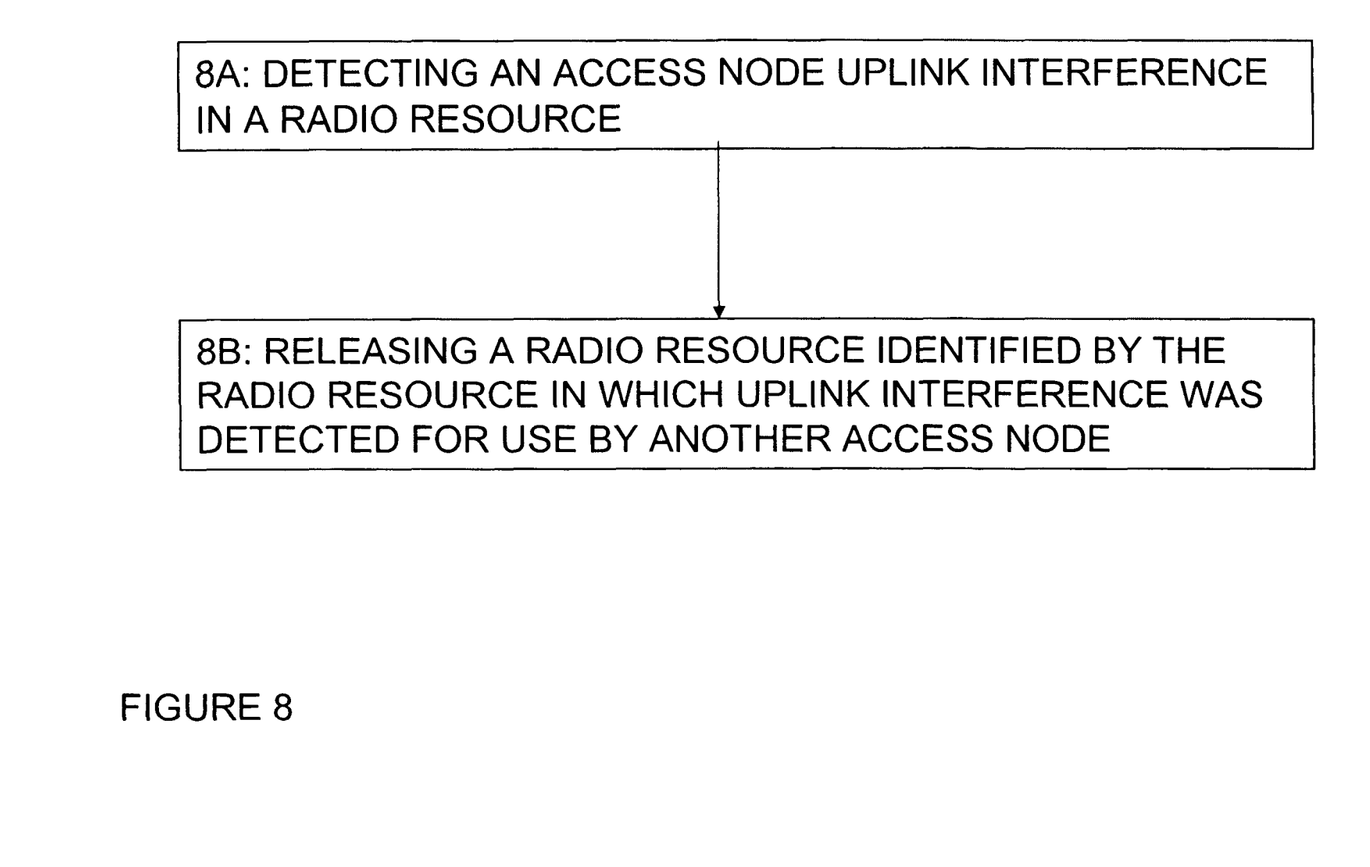

FIG. 8 is a logic flow diagram that illustrates the operation of a method, and a result of execution of computer program instructions, further in accordance with the exemplary embodiments of this invention. In accordance with these exemplary embodiments a method performs, at Block 8A, a step of detecting at an access node uplink interference in a radio resource and, at Block 8B, releasing a radio resource identified by the radio resource in which uplink interference was detected for use by another access node.

In the method of the preceding paragraph, where the interference is received in a transmission from a mobile node that is served by another access node.

In the method of the preceding paragraph, where the step of releasing comprises identifying the released radio resource in a downlink beacon transmission for reception by the mobile node.

In the method of the preceding paragraphs, where the step of detecting comprises receiving the interfering signal in the identified radio resource, or receiving the interfering signal in a first radio resource, and mapping the first radio resource onto the identified radio resource.

The various blocks shown in FIGS. 7 and 8 may be viewed as method steps, and/or as operations that result from operation of computer program code, and/or as a plurality of coupled logic circuit elements constructed to carry out the associated function(s).

The exemplary embodiments of this invention also provide an apparatus that comprises a controller configured to operate with a wireless transmitter and a wireless receiver to receive an identification of a radio resource from a serving access node and to transmit an interfering signal that specifies the identified radio resource.

In the apparatus of the preceding paragraph, where the identified radio resource is one reserved for use by another, non-serving access node.

In the apparatus of the preceding paragraphs, where the controller is configured to transmit the interfering signal in the identified radio resource, or to transmit the interfering signal in a radio resource that is predetermined to map onto the identified radio resource.

The exemplary embodiments of this invention also provide an apparatus that comprises a controller configured to operate with a wireless transmitter and a wireless receiver to detect at an access node uplink interference in a radio resource and to release a radio resource identified by the radio resource in which uplink interference was detected for use by another access node.

In the apparatus of the preceding paragraph, where the interference is received in a transmission from a mobile node that is served by another access node.

In the apparatus of the preceding paragraph, where the controller is further configured to identify the released radio resource in a downlink beacon transmission for reception by the mobile node.

In the apparatus of the preceding paragraphs, where the controller is further configured to receive the interfering signal in the identified radio resource, or to receive the interfering signal in a first radio resource, and to map the first radio resource onto the identified radio resource.

In general, the exemplary embodiments of this invention may be implemented at least in part by computer software executable by the controllers 10A, 20A, or by hardware, or by a combination of software and hardware (and firmware). The controllers 10A, 20A may be of any type suitable to the local technical environment, and may include one or more of general purpose computers, special purpose computers, microprocessors, digital signal processors (DSPs) and processors based on a multi-core processor architecture, as non-limiting examples. The computer readable memories 10B and 20B may be of any type suitable to the local technical environment and may be implemented using any suitable data storage technology, such as semiconductor based memory devices, flash memory, magnetic memory devices and systems, optical memory devices and systems, fixed memory and removable memory.

It is noted that the various embodiments of user equipment, such as indicated by a UE1 or UE2, can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments may include various integrated circuits and, in a most compact case, may all be embodied physically within a single chip.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention. For example, while the exemplary embodiments have been described above at least partially in the context of the LTE-A system, it should be appreciated that the exemplary embodiments of this invention are not limited for use with only this one particular type of wireless communication system, and that they may be used to advantage in other wireless communication systems. Further, it should be appreciated that the use of this invention may be made in both TDD and FDD type systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    transmitting a beacon from a first access node to a first user equipment associated with the first access node and also to a second user equipment associated with a second access node, where the beacon includes information indicating a priority of the first access node with respect to a radio resource allocation; and
    receiving feedback from the first user equipment associated with the first access node, where the feedback includes information indicating a priority of the second access node, where the first access node relinquishes radio resources if the second access node has a higher priority and has a need for additional resources,
    wherein the priority is configured to provide a penalty for reserving more resources than are actually needed by the first access node and/or the second access node,
    the method further comprises computing a value of the priority based on an average amount of the radio resources reserved in the past; and
    the value of the priority is computed by implementing the following equation:

$$pr(t+1) = \alpha \cdot pr(t) + (1-\alpha) \cdot \left(1 - \frac{\# \text{ reserved\_RBs}}{\# \text{ total\_RBs} + 1}\right),$$

wherein
pr=priority value
t=time unit,
α=weighting factor or forgetting factor, and
    RBs=resource blocks.

2. The method according to claim 1, where the priority of the first access node has a value that changes over time depending on an amount of radio resources reserved by the first access node, where the priority decreases as the first access node reserves more radio resources and increases as the first access node reserves fewer radio resources.

3. The method according to claim 1, where the priority of the second access node was received by the first user equipment in a beacon from the second access node.

4. An apparatus comprising:
    at least one processor; and at least one memory including computer program code, where the at least one memory and the computer program code are configured, with the at least one processor, to cause the apparatus to at least:
    transmit a beacon from a first access node to a first user equipment associated with the first access node and also to a second user equipment associated with a second access node, where the beacon includes information indicating a priority of the first access node with respect to a radio resource allocation; and
receive feedback from the first user equipment associated with the first access node, where the feedback includes information indicating a priority of the second access node, where the apparatus relinquishes radio resources at the first access node if the second access node has a higher priority and has a need for additional resources,
wherein the priority is configured to provide a penalty for reserving more resources than are actually needed by the first access node and/or the second access node,
the at least one memory and the computer program code are further configured, with the at least one processor, to cause the apparatus to at least compute a value of the priority based on an average amount of the radio resources reserved in the past, and
the value of the priority is computed by implementing the following equation:

$$pr(t+1) = \alpha \cdot pr(t) + (1-\alpha) \cdot \left(1 - \frac{\#\text{ reserved\_RBs}}{\#\text{ total\_RBs} + 1}\right),$$

wherein
pr=priority value,
t=time unit,
α=weighting factor or forgetting factor, and
RBs=resource blocks.

5. The apparatus according to claim 4, where the priority of the first access node has a value that changes over time depending on an amount of radio resources reserved by the first access node, where the priority decreases as the apparatus reserves more radio resources for the first access node and increases as the apparatus reserves fewer radio resources for the first access node.

6. A method comprising:
adjusting a value of a priority of a wireless network access node over time depending on an amount of radio resources reserved for use by the wireless network access node, where the priority value decreases as more radio resources are reserved and increases as fewer radio resources are reserved; and
transmitting the value of the priority to at least one other wireless network access node,
wherein the priority is configured to provide a penalty for reserving more resources than are actually needed by the wireless network access node,
the method further comprises computing a value of the priority based on an average amount of the radio resources reserved in the past, and
the value of the priority is computed by implementing the following equation:

$$pr(t+1) = \alpha \cdot pr(t) + (1-\alpha) \cdot \left(1 - \frac{\#\text{ reserved\_RBs}}{\#\text{ total\_RBs} + 1}\right),$$

wherein
pr=priority value,
t=time unit,
α=weighting factor or forgetting factor, and
RBs=resource blocks.

7. The method according to claim 6, where transmitting takes place via a wireless network mobile node.

8. An apparatus comprising:
at least one processor; and
at least one memory including computer program code, where the at least one memory and the computer program code are configured, with the at least one processor, to cause the apparatus to at least: adjust a value of a priority of a wireless network access node over time depending on an amount of radio resources reserved for use by the wireless network access node, where the priority value decreases as more radio resources are reserved and increases as fewer radio resources are reserved; and
transmit the value of the priority to at least one other wireless network access node,
wherein the priority is configured to provide a penalty for reserving more resources than are actually needed by the wireless network access node,
the at least one memory and the computer program code are further configured, with the at least one processor, to cause the apparatus to at least compute a value of the priority based on an average amount of the radio resources reserved in the past, and
the value of the priority is computed by implementing the following equation:

$$pr(t+1) = \alpha \cdot pr(t) + (1-\alpha) \cdot \left(1 - \frac{\#\text{ reserved\_RBs}}{\#\text{ total\_RBs} + 1}\right),$$

wherein
pr=priority value,
t=time unit,
α=weighting factor or forgetting factor, and
RBs=resource blocks.

9. The apparatus according to claim 8, where transmitting takes place via a wireless network mobile node.

10. The method according to claim 1, wherein the value of the priority decreases in time once the resources are reserved for use.

11. The method according to claim 1, wherein any free or unreserved resources are taken regardless of the priority of the first access node or the second access node.

12. The method according to claim 1, wherein the first access node and the second access node are not left without any radio resources regardless of how low each of their priorities are.

13. The method according to claim 1, wherein the penalty is that it lowers the priority of the first access node or the second access node proportionately when more resources are reserved than used.

14. The apparatus according to claim 4, wherein the penalty is that it lowers the priority of the first access node or the second access node proportionately when more resources are reserved than used.

15. The apparatus according to claim 4, wherein the at least one memory and the computer program code are configured, with the at least one processor, to cause the apparatus to at least compute a value of the priority based on an average amount of the radio resources reserved in the past.

16. The apparatus according to claim 4, wherein a value of the priority decreases in time once the resources are reserved for use.

17. The apparatus according to claim 4, wherein any free or unreserved resources are taken regardless of the priority of the first access node or the second access node.

18. The apparatus according to claim 4, wherein the first access node and the second access node are not left without any radio resources regardless of how low each of their priorities are.

* * * * *